United States Patent [19]
Hale

[11] Patent Number: 4,859,226
[45] Date of Patent: Aug. 22, 1989

[54] UNIVERSAL LOWER STEM MOLD FOR MANUFACTURING A MOLDED GLASS STEM

[75] Inventor: John R. Hale, Lancaster, Pa.

[73] Assignee: Thomson Consumer Electronics, Inc., Indianapolis, Ind.

[21] Appl. No.: 231,340

[22] Filed: Aug. 11, 1988

[51] Int. Cl.⁴ .................. C03B 11/14; C03C 29/00
[52] U.S. Cl. .................. 65/139; 65/59.25; 65/59.27; 65/59.28; 65/59.7; 65/140
[58] Field of Search .......... 65/59.25, 59.27, 59.28, 65/59.6, 59.7, 139, 140

[56] References Cited

U.S. PATENT DOCUMENTS

| | | | |
|---|---|---|---|
| 2,312,003 | 2/1943 | Schneider et al. | 65/140 |
| 2,338,507 | 1/1944 | Haas et al. | 250/27.5 |
| 2,340,879 | 2/1944 | Horn | 49/81 |
| 2,618,904 | 11/1952 | Gartner | 49/2 |
| 2,781,613 | 2/1957 | Watkins | 65/140 X |
| 2,864,205 | 12/1958 | Lyle | 65/140 X |
| 3,201,216 | 8/1965 | Handmann | 65/138 |
| 4,767,436 | 8/1988 | Hale | 65/59.27 |
| 4,801,320 | 1/1989 | Prost | 65/140 X |
| 4,813,991 | 3/1989 | Hale | 65/139 |
| 4,813,992 | 3/1989 | Hale | 65/140 |
| 4,824,459 | 4/1989 | Hale | 65/59.26 |

Primary Examiner—Arthur Kellogg
Attorney, Agent, or Firm—Eugene M. Whitacre; Dennis H. Irlbeck; Vincent J. Coughlin, Jr.

[57] ABSTRACT

An apparatus for manufacturing a glass stem for an electron tube comprises a first (upper) stem mold assembly and an improved second (lower) stem mold assembly. The improved second stem mold assembly includes a universal second (lower) stem mold having a plurality of lead-in conductor receiving openings formed therethrough. At least one removable stem mold plug is disposed and retained within one of the openings.

3 Claims, 3 Drawing Sheets

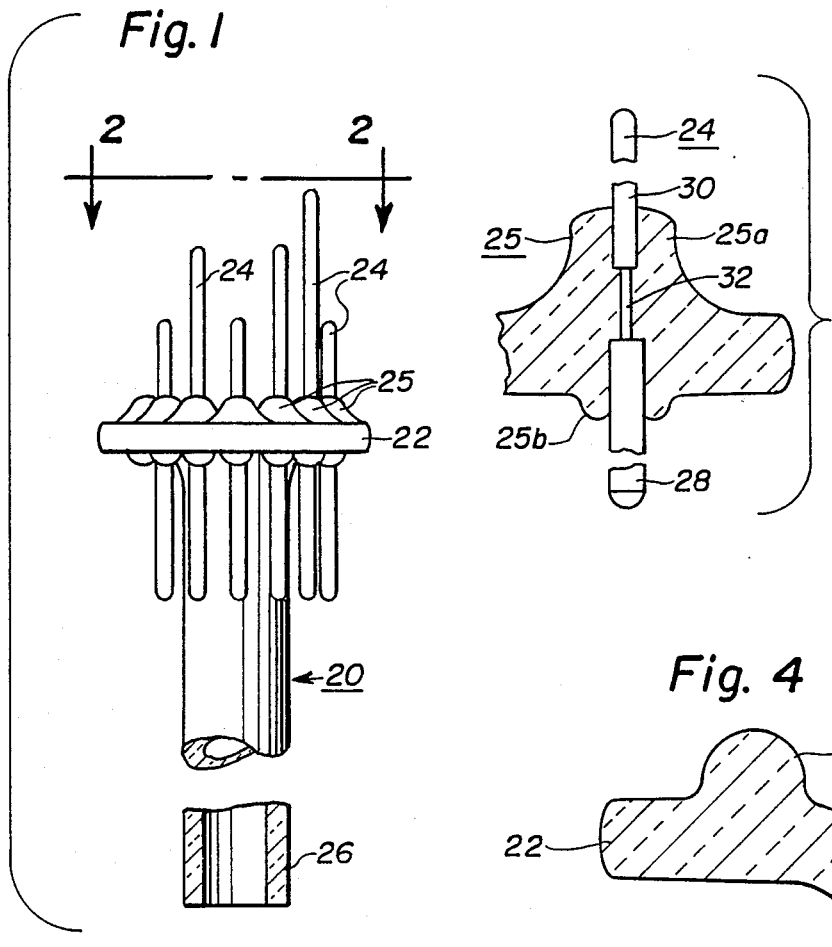

UNIVERSAL LOWER STEM MOLD FOR MANUFACTURING A MOLDED GLASS STEM

BACKGROUND OF THE INVENTION

This invention relates to an apparatus for manufacturing a glass stem, and more particularly to a universal lower stem mold capable of making a cathode-ray tube (CRT) glass stem having from five to twelve lead-in conductors (or leads) extending through a glass disk in a direction perpendicular to the plane of the disk and forming a circular array of leads.

U.S. Pat. No. 3,201,216 issued to Handmann on Aug. 17, 1965 describes an apparatus for producing an electronic tube stem. Such a stem is usually made by inserting the leads in openings in a rotatable lower portion of a stem mold which is mounted on an indexable turret. A glass cylinder is placed on the lower stem mold assembly around or within the leads (or both) and then the leads and the glass cylinder are heated to melt the glass. The glass cylinder is pressed into a disk in which the leads are embedded. Each of these operations takes place at an indexed position of the turret. During the heating operation, the leads, the glass cylinder, and the lower portion of the stem mold assembly, are rotated to uniformly heat the glass. During the pressing step, the upper portion of the stem mold assembly is pressed down onto the glass cylinder. Usually, the upper mold assembly is either rotated in synchronism with, and in properly indexed relation to, the lower mold assembly, or the lower mold assembly is stopped in properly indexed position relative to the stationary upper mold assembly. When the upper mold assembly is lowered to the pressing position, the leads extend into lead receiving holes in the upper mold assembly. As is known in the art, a tubulation is usually centrally disposed within the disk to permit evacuation and seal-off of the CRT. While most rotary stem machines have 24 or 30 lower stem mold assembly positions, there usually are only two, three or four upper mold assembly positions on a stem machine, the actual number reflects the preference of the machine designer. While the upper mold assemblies differ slightly from station-to-station and can be though of, for convenience, as progressing from a rough press to a finished press, the lower stem mold assemblies, which transport the stem during the manufacturing operation, are identical to one another. It is the present practice to provide a specific lower stem mold for each type of CRT stem made. In other words, a five lead stem requires a lower stem mold having five lead openings therethrough to accommodate the five leads of the stem. Twenty-four or thirty such stem molds are required for each stem machine. If a nine or twelve lead stem is to be produced, each of the twenty-four or thirty lower stem molds in the stem machine must be changed to stem molds having the required number of lead openings. This change in lower stem mold configuration makes it inconvenient and expensive to change the stem design, for example to change the number or location of the stem leads. Even if a stem machine is dedicated to producing only one type of stem, occasionally it is necessary to replace a worn or damaged lower stem mold and a variety of different molds must be maintained in inventory to accommodate the different stem types.

SUMMARY OF THE INVENTION

An apparatus for manufacturing a glass stem for an electron tube comprises a first stem mold assembly and an improved second stem mold assembly. The improved second stem mold assembly includes a universal second stem mold having a plurality of lead-in conductor receiving opening formed therethrough. At least one removable stem mold plug is disposed and retained within one of the openings.

BRIEF DESCRIPTION OF THE DRAWINGS

FIG. 1 is a partially cut-away longitudinal view of a molded glass stem made according to the present invention.

FIG. 2 is a top view taken along line 2—2 of FIG. 1.

FIG. 3 is a partial sectional view taken along line 3—3 of FIG. 2.

FIG. 4 is a partial sectional view taken along line 4—4 of FIG. 2.

FIG. 7 is a perspective view of a stem mold plug according to the present invention.

DETAILED DESCRIPTION OF THE PREFERRED EMBODIMENT

Figure 5:
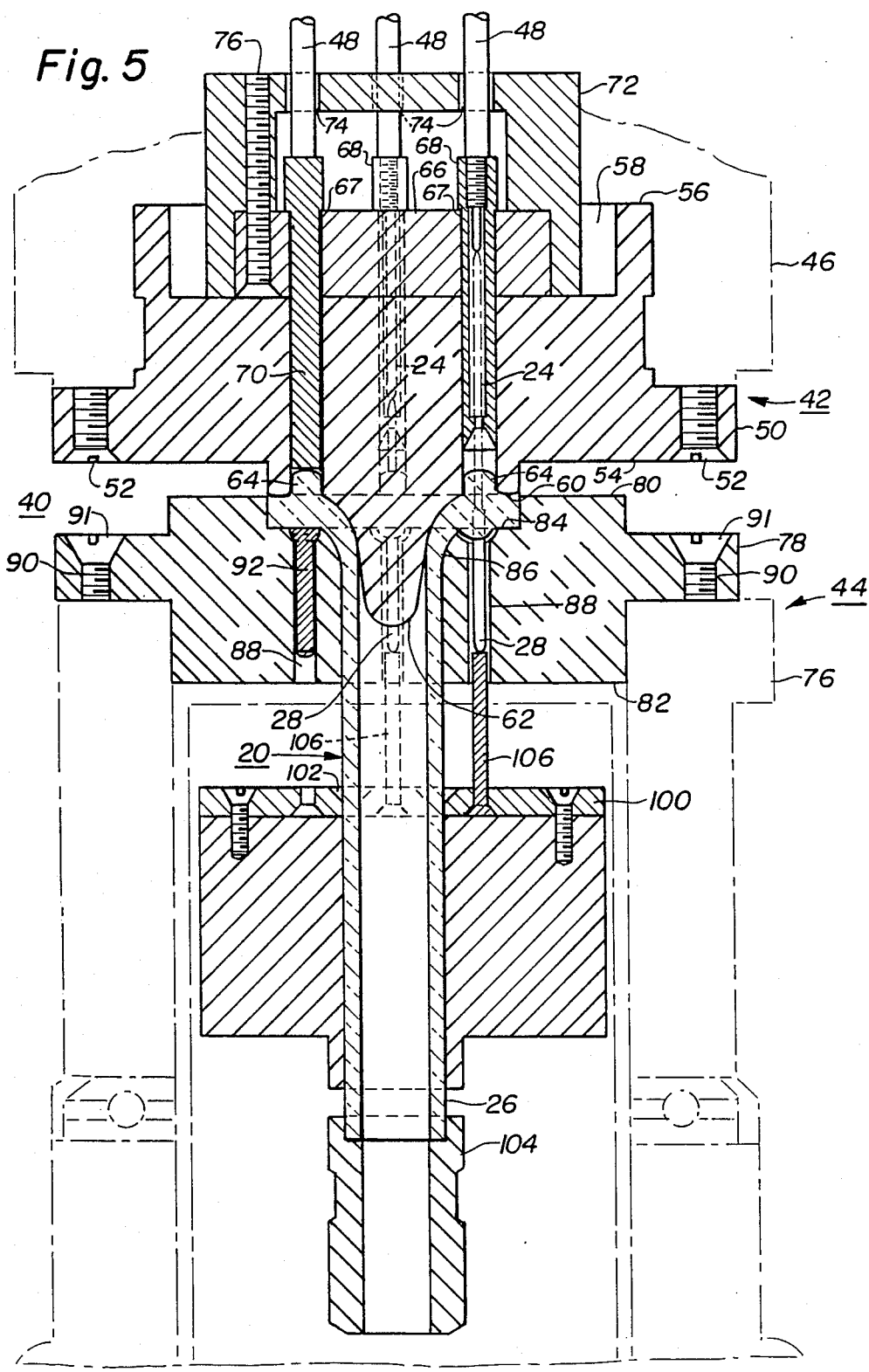
FIG. 5 shows a partial cut-away longitudinal view of a stem mold according to the present invention.

FIGS. 1, 2, 3 and 4 show a molded glass stem 20 that may be made by the stem manufacturing apparatus described herein. The stem 20 is used in an electron tube (not shown) such as a cathode-ray tube, CRT, and includes a glass disk 22 having a plurality of lead-in conductors or leads 24 extending through a plurality of fillets 25 in a direction perpendicular to the plane of the disk 22 and forming a circular array of leads. As shown in FIG. 3, the leads 24 preferably are a three-piece structure comprising an outer lead 28, an inner lead 30 and a central press lead 32. The leads are round, copper sheathed, 42 percent nickel-iron wire, coated with fused sodium tetraborate. This material is commonly known as dumet. Alternatively, a one-piece lead of 52 alloy (52% nickel, balance iron) may be used. One or more dummy fillet 25', i.e., fillets without leads therethrough, also are provided. The fillets 25 include an interior portion 25a and an exterior portion 25b which surround and support the leads 24. The dummy fillets 25' are devoid of an exterior portion as described hereinafter. A tubulation 26 is integral with the glass disk 22 and provides a means for evacuating and sealing the evacuated electron tube.

As shown in FIG. 5, the stem 20 is made by using a stem mold 40 comprising a first or upper stem mold assembly 42 and a novel second or lower mold assembly 44. The first stem mold assembly 42 is described in my copending U.S. patent applications Ser. Nos. 114,356 filed Oct. 29, 1987; 196,593 filed May 20, 1988; 196,594 filed May 20, 1988 and 196,595 filed May 20, 1988, and includes a mold head 46 (only a portion of which is shown) having therein a plurality of lead weights 48 attached to one end (not shown) of the mold head 46 by a plurality of springs (also not shown) which exert a downward force on the lead weights. A first mold block 50 is attached to the other end of the mold head 46 by screws 52. The first mold block 50 has a first surface 54 and an oppositely disposed second surface 56. A cavity 58 is formed in the second surface 56 of the mold block 50. The first surface 54 includes a stem press or glass contacting portion 60 having a centrally disposed projection 62 extending away from the stem press portion. A plurality of longitudinal openings 64 are drilled on a 15.44 mm (0.608 inch) diameter pin circle through the mold block 50 from the first surface 54 to the cavity 58 in the second surface 56. As described in my copending application Ser. No. 196,595, preferably fourteen holes are provided to produce any type of stem commonly used for electron tubes. An insert guide 66 having a plurality of guide openings 67 is disposed within the cavity 58. A plurality of lead-accommodating inserts 68 and dummy fillet inserts 70 are disposed within the guide openings 67. A translator 72 having a corresponding plurality of translator openings 74, aligned with the inserts 68 and 70 is attached to the insert guide 66 by means of screws 76 (only one of which is shown). The lead-accommodating inserts 68 accommodate the leads 24 of different lengths as described in my copending patent application Ser. No. 196,595. The lead weights 48 extend through the translator openings 74 and contact the inserts 68 and 70 to retain the inserts within the mold block 50.

The second or lower mold assembly 44 has a second mold body 76 with a novel universal second (lower) stem mold 78 attached thereto. The universal second stem mold 78 has a first surface 80 and an oppositely disposed second surface 82. A stem forming recess 84 is formed in the first surface 80. A centrally disposed tubulation aperture 86, formed in the bottom of the stem-forming recess 84, communicates with the second surface 82 of the universal second stem mold 78. The recess 84 further includes a plurality of lead-in conductor receiving openings 88 which circumscribe the tubulation aperture 86 and extend from the recess 84 to the second surface 82 of the universal second stem mold 78. Unlike prior lower stem molds which are designed to accommodate only the number of lead-in conductors in the finished stem, the novel universal lower stem mold 78 has fourteen openings 88 therethrough to allow the fabrication of any type of CRT stem.

Figure 6:
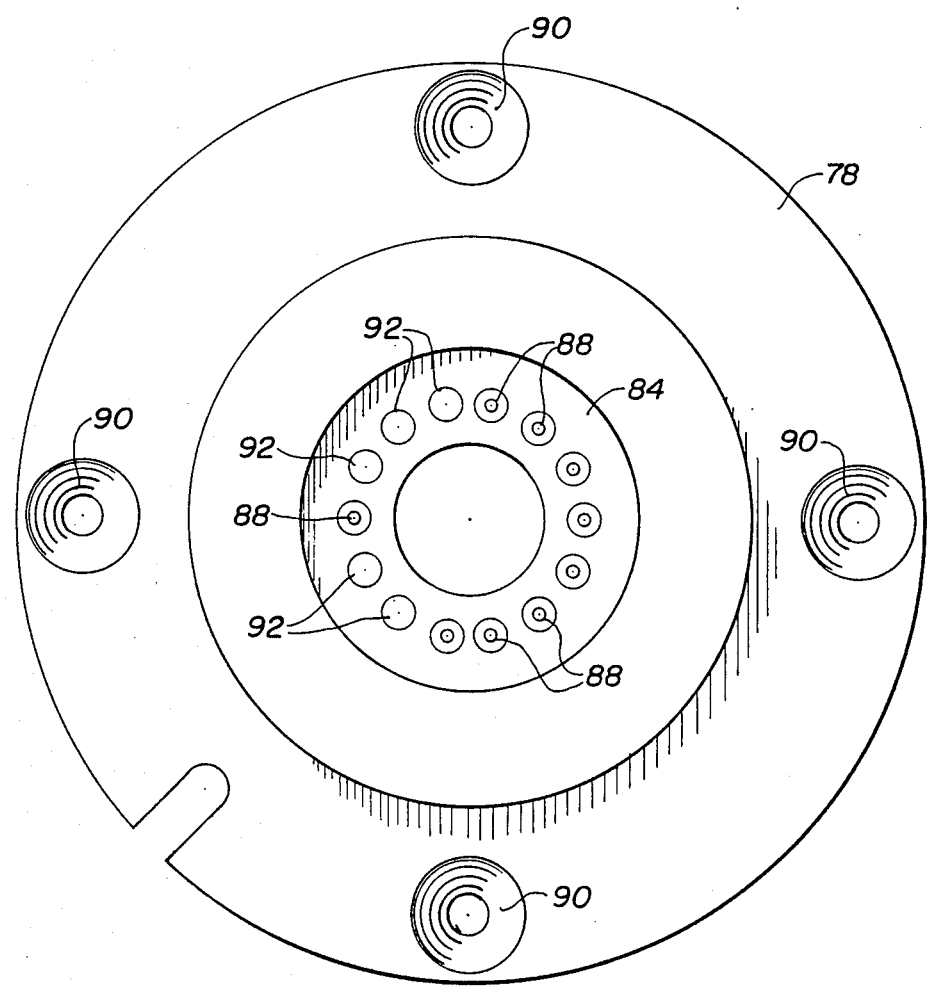
FIG. 6 is a top view of the novel universal lower stem mold.

As shown in FIG. 6, the openings 88 of the universal lower stem mold 78 lie on a pin circle having a diameter of 15.44 mm (0.608 inch). Each of the openings 88 has a through-diameter of 1.15 mm (0.0453 inch) center bored to a diameter of 2.54 mm (0.1 inch) and to a depth of 1.02 mm (0.040 inch) to form the exterior portions 25b of the fillets 25. Four counter sunk screw holes 90 are provided around the periphery of the universal lower stem mold 78 to facilitate attachment thereof to the second mold body 76 by means of screws 91 (shown in FIG. 5). At least one, and preferably a plurality of stem mold plugs 92 are removeably disposed and retained within selected ones of the openings 88. The plugs 92, one of which is shown in FIG. 7, are designed to provide an interference fit with the portion of the universal lower stem mold 78 circumscribing the openings 88. Each of the plugs 92 includes a longitudinal body portion 94 which is disposed within the lead-in conductor receiving opening 88 and a head 96 which conforms to the center-bored portion of the opening.

The second mold assembly 44 includes a moveable support platform 100 having a centrally disposed tubulation recess 102 formed therein. The tubulation 26 of the stem 20 rests on a tubulation support 104 in the lower portion of the second mold assembly 44. A plurality of lead-in-conductor-supports 106 are attached to the support platform 100. Unlike prior art platform structures such as that described in my copending patent application Ser. No. 114,356, in which the number of lead-in conductor supports varied from five to twelve depending on the number of leads in the stem, the present platform 100 can accommodate up to fourteen of the supports 106, one for each of the openings 88 which are aligned therewith. The lead-in-conductor supports 106 extend partially into the openings 88 to provide a support for the outer portions 28 of the leads 24. Thus, there is no longer a need to maintain an inventory of separate lower mold assemblies for each different stem type. As shown in FIG. 5, a stem mold plug 92 is disposed in each of the openings 88 aligned with one of the dummy fillet inserts 70 Lead-in conductor supports 106 are disposed on the support platform 100 in locations aligned with the openings 88 having outer portions 28 of the leads 24 therein. In other words, there are no lead-in-conductor supports 106 within the openings 88 occupied by the stem mold plugs 92.

Fabrication of the stem 20 is similar to the fabrication of a prior art stem described in my copending U.S. patent application Ser. No. 114,356. The outer portions 28 of the lead-in conductors 24 are loaded into the openings 88 of the universal lower stem mold 78 that are aligned with the lead-in-conductive supports 106. Stem mold plugs 92 are disposed within the remaining opening 88. As shown in FIG. 6, the lower stem mold 78 is set-up to produce a nine-lead stem since five of the fourteen available openings 88 are closed by stem plugs 92. With reference to FIG. 5, a dummy fillet insert 70 is disposed within each of the openings 64 in the mold block 50 of the upper stem mold assembly 42 that are aligned with the stem mold plugs 92. Lead accommodating inserts 68 are disposed within the remaining openings 64 in the mold block 50. Each of the inserts 68 has a lead-accommodating opening therein designed to accommodate the inner lead portion 30 of the lead-in conductor 24 as described in my copending U.S. patent application Ser. No. 196,595. A mass of glass (not shown), is positioned around the lead-in conductors 24 on the lower stem mold assembly 44 and a tubulation 26 is disposed within the centrally disposed tubulation aperture 86 and recess 102. The tubulation 26 rests upon the tubulation support 104.

The mass of glass (not shown), the tubulation 26, the lead in conductors 24 and the lower stem mold assembly 44 are heated with a glass flame (not shown) to a temperature sufficient to melt the glass and the adjacent portion of the tubulation. The upper stem mold assembly 242 is repositioned relative to the lower stem mold assembly 44 so that the inner leads 30 of the lead-in conductors 24 extend into the openings in the lead accommodating inserts 68. The downward force exerted by the lead weights 48 on the inserts 68 is sufficient to hold the outer leads 28 of the lead-in conductors 24 in contrast with the lead-in conductor supports 106 of the lower stem mold assembly 44. The upper and lower stem mold assemblies 42 and 44, respectively, are brought together so that the mold block 50 and the universal second stem mold 78 simultaneously press the melted glass and the melted portion of the tubulation 26 to fuse the glass into a disc with fillets 25 having interior and exterior portions 25a and 25b, respectively, around the lead-in conductors 24. The dummy fillets 25' provide spacing and electrical isolation between selected ones of the leads 24. As shown in FIG. 4, the dummy fillets 25' comprise an interior portion only since the head 96 of the stem mold plug 92 completely covers the center-bored portion of the opening 88 in the universal second stem mold 78 and provides a flat outer surface on the stem disk 22 opposite the dummy fillet 25'.

At the completion of the molding step, the upper stem mold assembly 42 and the lower stem mold assembly 44 are separated and the completed stem 20 is ejected from the lower stem mold assembly 44 by the upwardly-directed pressure of the tubulation support 104 and the lead-in conductor supports 106 attached to the support platform 100 which contact the outer portions 28 of the lead-in conductors 24. Since there are no lead-in conductor supports 106 aligned with the openings 88 having stem mold plugs 92 therein, the stem mold plugs are not disturbed when the completed stem 20 is ejected from the lower stem mold assembly 44.

As shown in FIGS. 5 and 6 the nine-lead stem mold described herein can be readily adapted to produce stems having a greater or lesser number of lead-in conductors by providing a corresponding number of lead-in conductor supports 106 in the lower stem mold assembly 44 and lead-accommodating inserts 68 in the mold block 50 of the upper stem mold assembly 42. Stem mold plugs 92 are inserted in the remaining openings 88 in the universal second stem mold 78 and dummy fillet inserts 70 are disposed within the aligned openings 64 in the mold block 50 of the upper stem mold assembly 42.

What is claimed is:

1. In an apparatus for manufacturing a glass stem for an electron tube, said stem having a plurality of lead-in conductors and a greater plurality of fillets, said lead-in conductors extending through selected ones of said fillets, there being at least one dummy fillet without a lead-in conductor therethrough, said apparatus comprising a first mold assembly and a second mold assembly for forming said stem therebetween, said first mold assembly including fillet-forming means therein, the improvement wherein said second mold assembly comprises a universal second stem mold having a plurality of lead-in conductor receiving openings formed therethrough, and at least one removable stem mold plug disposed and retained within one of said opening.

2. In an apparatus for manufacturing a glass stem for an electron tube, said stem having a plurality of lead-in conductors and a greater plurality of fillets, said lead-in conductors extending through selected ones of said fillets, there being at least one dummy fillet without a lead-in conductor therethrough, said stem including a glass disk and a tubulation integral therewith, said disk having an obverse surface and a reverse surface, said apparatus comprising a first mold assembly and a second mold assembly for forming said stem therebetween, said first mold assembly including fillet-forming means for forming said fillets, including said dummy fillet, in said obverse surface of said disk, the improvement wherein said second mold assembly comprises a universal second stem mold having a first surface and an oppositely disposed second surface, a plurality of lead-in conductor receiving openings formed from said first surface to said second surface, at least one removable stem mold plug disposed and retained within one of said opening aligned with said dummy fillet forming means .

3. In an apparatus for manufacturing a glass stem for an electron tube, said stem having a plurality of lead-in conductors and a greater plurality of fillets, said lead-in conductors extending through selected ones of said fillets, there being a plurality of dummy fillets without lead-in conductors therethrough, said stem including a glass disk and a tubulation integral therewith, said disk having an obverse surface and a reverse surface, said apparatus comprising a first mold assembly and a second mold assembly for forming said stem therebetween, said first mold assembly including fillet-forming means for forming said fillets, including said dummy fillets, in said obverse surface of said disk, the improvement wherein said second mold assembly comprises a universal second stem mold having a first surface and an oppositely disposed second surface, a plurality of lead-in conductor receiving openings formed from said first surface to said second surface, said openings corresponding in number to the number of fillets in said stem, a removable stem mold plug being disposed and retained within each of said openings aligned with said dummy fillets forming means; and means for ejecting said stem from said universal second stem mold without removing said stem mold plug.

* * * * *

UNITED STATES PATENT AND TRADEMARK OFFICE
CERTIFICATE OF CORRECTION

PATENT NO. : 4,859,226
DATED : August 22, 1989
INVENTOR(S) : John R. Hale

It is certified that error appears in the above-identified patent and that said Letters Patent is hereby corrected as shown below:

Column 1, line 46, change "though" to --thought--.

Column 4, line 50, change "242" to --42--.

Signed and Sealed this

Twenty-first Day of August, 1990

Attest:

HARRY F. MANBECK, JR.

*Attesting Officer*   *Commissioner of Patents and Trademarks*